United States Patent [19]

Giammarese

[11] Patent Number: 4,551,714

[45] Date of Patent: Nov. 5, 1985

[54] REMOTE CONTROL APPARATUS FOR AUDIO SYSTEMS

[76] Inventor: Victor P. Giammarese, 4147 N. Melvina, Chicago, Ill. 60634

[21] Appl. No.: 480,892

[22] Filed: Mar. 31, 1983

[51] Int. Cl.[4] ............... H04Q 9/00; H04B 1/06
[52] U.S. Cl. ................... 340/825.72; 455/153
[58] Field of Search ........... 455/151, 154, 166, 150, 455/155, 161, 152–153; 340/825.72, 825.25, 825.76; 358/194.1, 193.1; 381/12; 334/17, 18, 20; 250/563

[56] References Cited

U.S. PATENT DOCUMENTS

| | | | |
|---|---|---|---|
| 1,938,397 | 12/1933 | Miller . | |
| 2,245,347 | 6/1941 | Koch | 340/825.72 |
| 2,524,281 | 10/1950 | Winfield . | |
| 2,907,217 | 10/1959 | Siegel | 74/10.15 |
| 3,757,303 | 9/1973 | Blass | 328/140 |
| 3,790,956 | 2/1974 | Ichikawa | 74/10.15 |
| 3,854,123 | 12/1974 | Banach | 340/825.72 |
| 3,904,967 | 9/1975 | Okada et al. | 455/151 |
| 3,988,680 | 10/1976 | Kolm | 74/10.15 |
| 4,127,876 | 11/1978 | Schwartz | 455/151 |
| 4,144,497 | 3/1979 | Andrea, III | 455/151 |
| 4,276,654 | 6/1981 | Nations et al. | 455/161 |
| 4,305,155 | 12/1981 | Romeo | 455/153 |

FOREIGN PATENT DOCUMENTS 56-157118 12/1981 Japan .................. 455/166

Primary Examiner—Donald J. Yusko
Attorney, Agent, or Firm—Marvin N. Benn; Milton S. Gerstein

[57] ABSTRACT

A remote control device for off-the-shelf stereo audio systems in which an R.F. receiver unit controls the functions of the stereo system through electric motors mounted upon the control shafts of the stereo receiver. The motor controlling the tuning function of the stereo receiver is switched off whenever a stereo station is reached during tuning by a photosensor attached over the stereo indicator light of the stereo receiver. Continuous operation of the motor controlling the tuning of the stereo receiver to bypass undesired stereo stations is achieved by overriding the signal from the photosensor. Each of the R.F. receiver unit and transmitter unit has a plurality of plug-in modules with each module having its own tuned circuit and dip switch, so that each module can be used for a separate control function. A digital controlled oscillator in the transmitter unit excites each transmitter module. The plug-in modules are easily inserted or removed to allow for easy replacement and for additional functional capabilities of the remote control system.

3 Claims, 7 Drawing Figures

FIG. 3
FIG. 5
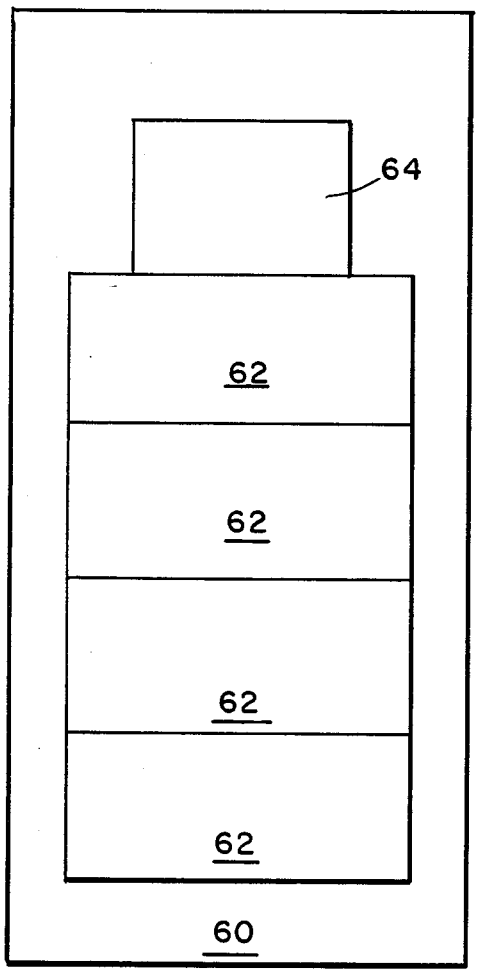
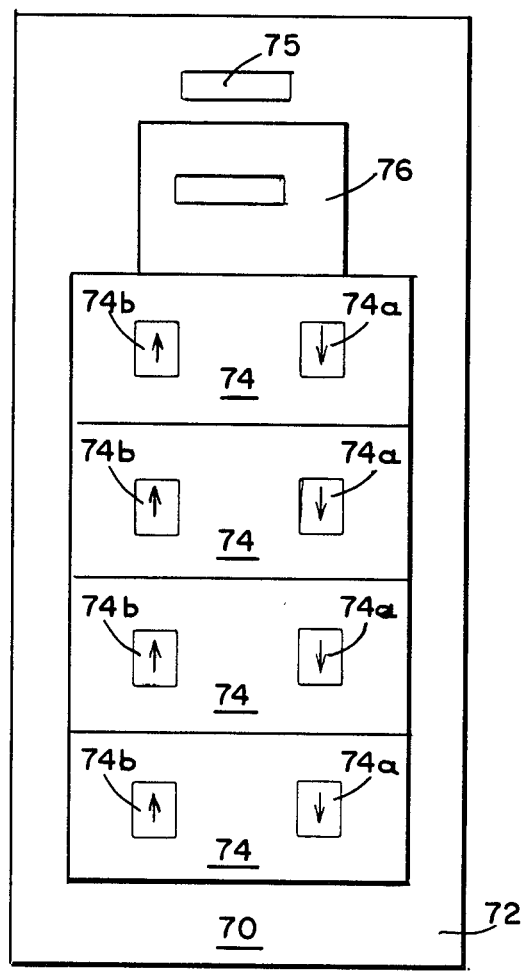
FIG. 4
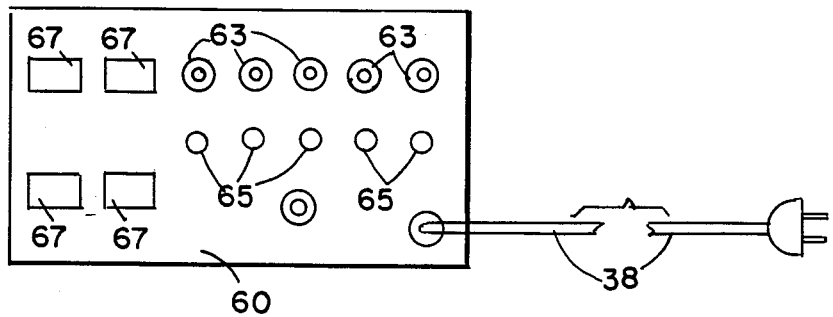

REMOTE CONTROL APPARATUS FOR AUDIO SYSTEMS

BACKGROUND OF THE INVENTION

Remote control devices for controlling apparatuses from a distance are well-known. Such devices have been used to remotely control television sets, garage doors, and many other equipment. Exmples of remote control devices for television receivers are disclosed in U.S. Pat. Nos. 2,907,217; 3,044,016; 3,054,957; 3,757,303; 3,790,956; and 4,305,155. Examples of remote control devices for radio apparatuses are disclosed in U.S. Pat. Nos. 1,938,397 and 2,524,281.

All of the above systems are complicated devices which have specific functions to be controlled, with little or no additional functional capabilities being built into the system. Each apparatus has its designated functions to be performed, whether they be the tuning of a television receiver, or the control of the volume of a radio receiver, and does not allow for subsequent functions to be remotely controlled when and if such subsequent functions arise and need to be remotely controlled. Each of these prior art devices is designed to perform control of specified functions, which have resulted in each device having a certain number of these functions remotely controlled and only these certain functions, without the capacity to add on additional functions at a later date, if desired.

SUMMARY OF THE INVENTION

In the present invention, the system to be remotely controlled is a standard, off-the-shelf stereo audio system having a stereo receiver or amplifier and speakers connected to the receiver or amplifier. The functions that need be controlled relate to the operation of the stereo receiver, and include volume control for the speakers, tuning of the stereo receiver to a desired radio station, bass control, treble control, balance control of the speakers, and power switching to the system.

The present remote control device for stereo audio systems is designed to be used in conjunction with existing and in-place stereo systems so that an owner of such a stereo system may purchase the remote control system of the present invention and easily and readily attach it to his or her stereo system. The remote control system of the present invention is designed to be used with most existing stereo systems and insures an easy and inexpensive manner of remotely controlling the functions of the conventional stereo system.

Since in every stereo system, the three basic functions that would normally be desired to be remotely controlled are: power switching to the receiver; tuning the stereo receiver to a desired station; and volume control of the speakers, the basic unit of the present invention would provide these three remote control functions. However, since the present invention is so designed to incorporate additional tuned circuit control modules in its R.F. receiver unit and transmitter unit, additional control functions of the stereo system may be easily and inexpensively provided by simply inserting additional modules in the R.F. receiver and transmitter. For example, if four sets of speakers are used at remote locations, then four separate and distinct tuned circuit modules may be used in each of the R.F. receiver unit and transmitter unit, which modules readily and simply plug into the units.

The remote control device of the present invention includes an R.F. receiver unit and a transmitter unit, which are well-known in the art. However, as described above, each of these units is provided with separate and distinct plug-in modules, each module being a tuned circuit with its own dip switch set to a particular and unique frequency, so that each transmitter module can send out separate control signals to operate a separate function of the stereo system. If, for example, four sets of speakers are used in a stereo system, then a user need only insert four of these plug-in modules in each of the R.F. receiver unit and transmitter unit, to thereby control separately each set of speakers.

According to the present invention, remote control of the tuning of the stereo receiver is accomplished by providing a motor on the tuning control shaft, which motor slides over such control shaft, to thereby rotate it upon excitation. A photosensor, such as a photovoltaic sensor, is attached over the stereo indicator light of the stereo receiver, which photosensor is connected to the base of a transistor switch, to thereby reverse bias the base-emitter circuit and cut-off current to the motor whenever a stereo station is tuned in. Bypassing stereo stations is allowed by a second transistor switch controlled by the R.F. receiver which overrides the first transistor switch upon a control signal from the transmitter unit, so that the motor controlling the tuning control shaft continuously rotates the tuning shaft.

Each of the functions to be controlled (except power switching) by the remote control system of the present invention will utilize a motor similar to that described above, and mounted on a control shaft, such as the volume control shaft, the bass control shaft, the balance control shaft, and the like. Each motor is in turn controlled by the R.F. receiver unit which receives its signals from the transmitter unit.

BRIEF DESCRIPTION OF THE DRAWING

The invention will be more readily understood with reference to the accompanying drawing, wherein:

FIG. 3 is a top view of the modular remote control R.F. receiver unit of the present invention showing the separate and distinct tuned circuit plug-in modules of the invention;

FIG. 4 is a rear view of the modular remote control R.F. receiver unit of the present invention showing the outlets for connection to the various audio equipment;

FIG. 5 is a top view of the modular remote control R.F. transmitter unit of the present invention showing the separate and distinct tuned circuit plug-in modules of the present invention.

DETAILED DESCRIPTION OF THE INVENTION

Figure 1A:
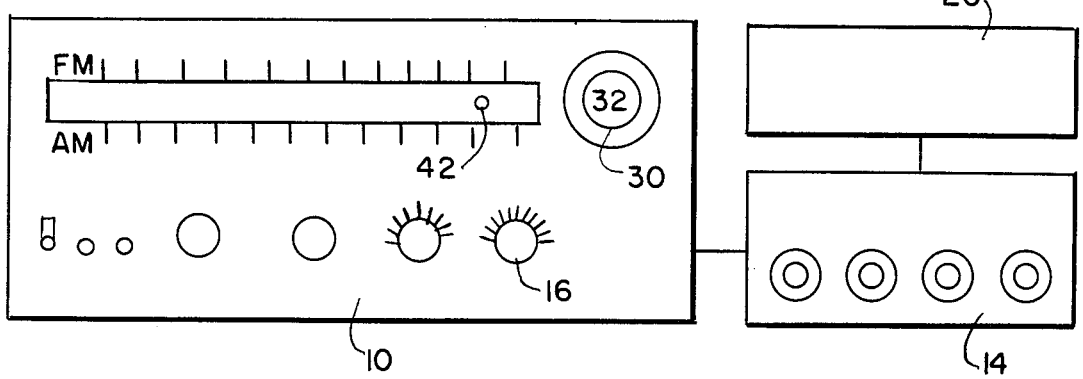
FIG. 1A is a front view of a stereo receiver and speaker system with the modular remote control R.F. receiver unit of the present invention shown attached.

Referring now to the drawing in greater detail, wherein like reference numerals indicate like parts, the stereo system remote control device of the present invention is shown in conjunction with a stereo receiver 10. In FIG. 1A, the stereo receiver 10 has the standard controls, such as volume, tuning, bass, etc., with speaker volume controls 14 also shown. A modular remote control R.F. receiver unit 20 of the present invention is also shown connected to the stereo receiver, which R.F. receiver unit provides the control of as many functions as demanded; for example, the R.F. receiver unit may control the tuning, volume, and balance control functions of the stereo receiver in a manner described below.

Figure 2:
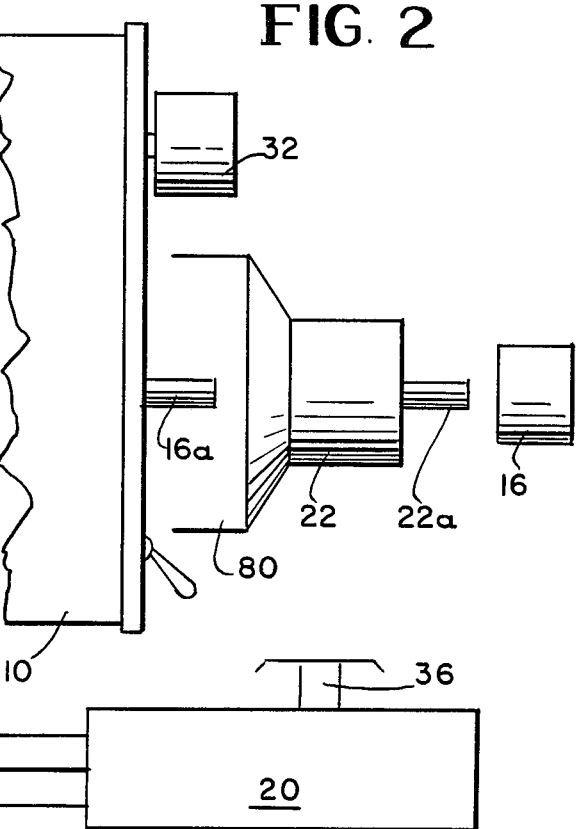
FIG. 2 is a side view of the stereo receiver upon which a motor has been places on the tuner control shaft for rotating the shaft, which motor is controlled by the modular remote control R.F. receiver unit, and the photosensor of the present invention.

The R.F. receiving unit 20 controls motors placed on the shafts of the control functions, in a manner shown in FIG. 2. A motor 22 is mounted to the volume control shaft 16a of the stereo receiver, which motor 22 is then controlled by the output signals from the R.F. receiver unit. An original knob 16 of the volume function of the receiver 10 may be placed on the control shaft 22a of the motor 22 so that manual control of the volume is always present and available. While only a motor for controlling the volume has been shown, it is to be understood that for the other functions that may be controlled, similar motor arrangements will be provided, all controlled by the R.F. receiver unit. It is noted that the control shaft 16a slides into the center, longitudinally extending bore of the motor 22 in which it is keyed, or otherwise attached, to the motor shaft.

Figure 1B:
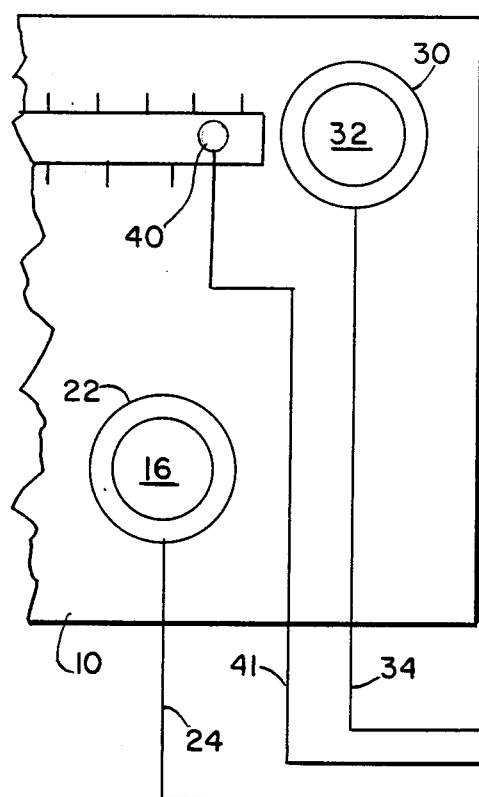
FIG. 1B is a front view similar to FIG. 1A and showing the photosensor element of the present invention attached over the stereo indicator light of the stereo receiver, which photosensor is shown connected to the modular remote control R.F. receiver unit of the present invention.

In FIG. 1B. there are shown the motor 22 attached to the volume control shaft of the stereo receiver 10, and another motor 30 attached to the tuner control shaft. Tuner control knob 32 is also attached to the motor control shaft of motor 30a (not viewable) in the same manner as described above with reference to the motor 22 and volume control shaft 16a. Lead lines 24, 34, and 41 extend, respectively, from the motor 22 photosensor 40 and 30 to the R.F. receiver unit 20 for control thereby. The R.F. receiver unit 20 supplies power to the stereo receiver 10 via an A.C. power cord 36, while the R.F. receiver receives power via an A.C. outlet cord 38, insertable into a remote source of power supply.

While only two motors have been shown operatively attached to two control functions of the stereo receiver, it is to be understood that the other control shafts may be fitted with control motors, in the same fashion as motors 22 and 30, with all of the motors being controlled by the R.F. receiver unit 20, in a manner to be described below.

It is shown in FIG. 1B, that a photosensor 40 is attached over a stereo indicator light 42, which stereo indicator light is illuminated by electronic means contained within the stereo receiver 10 whenever a stereo station is tuned in. The photosensor 40 is a photovoltaic sensor that supplies a voltage when light impinges thereon, in the well-known manner. The photosensor 40 is used to shut off current to the control motor 30 controlling the tuning function via a conventional transistor switch in the R.F. receiver unit 20. The transistor switch, for example an NPN transistor (not shown), will reach cut-off whenever the voltage applied by the photosensor 40 is applied to the base of the transistor. With a NPN transistor, the photosensor supplies a negative voltage to the base of the transistor, whereas if a PNP transistor were used, the photosensor would provide positive voltage. Thus, when the motor 30 is rotating the shaft to thereby tune the stereo receiver 10, as a stereo station is located, it is received by receiving means within the receiver unit 20 via the stereo indicating light which is illuminated and sensed by the photosensor 40, thereby cutting off the motor 30, and thereby causing the stereo station to be tuned in. Of course, it is desirable to skip over many stereo stations, and to this end, a second transistor switch is also provided that will override the first transistor switch whenever the tuning button switch of the transmitter 50 of the present invention is sending control signals to the R.F. receiver unit 20. Such a method using the second transistor switch for override is well-known in the art.

Figure 6:
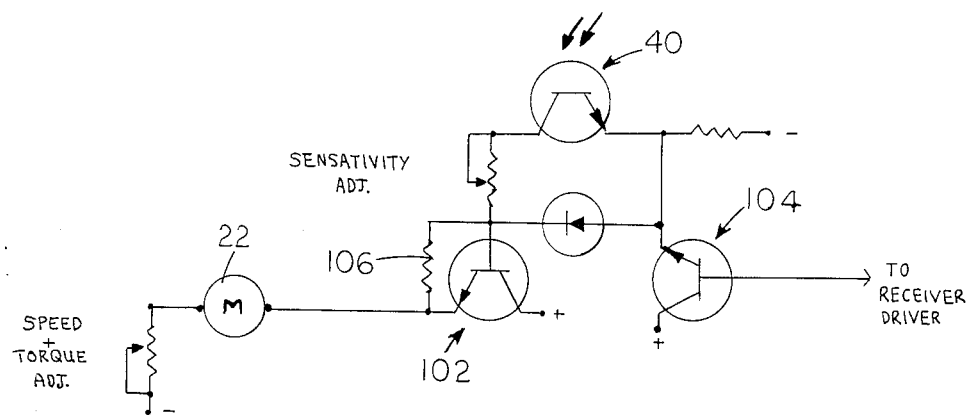
FIG. 6 is a schematic of the transistor switching circuit and transistor override therefor.

FIG. 6 shows in schematic form these transistors. The motor 22 for driving the stereo tuner is in series with transistor switch 102, the base of which can be biased firstly by the output voltage from the photosensor 40, which in the preferred embodiment is a transistor. The negative collector output of the photosensor will reverse bias the transistor switch 102 when the stereo light is illuminated, thus tending to cut off current to the reversible motor 22, if the receiver is not receiving a signal from the transmitter to drive the motor. If such signal is present, then the emitter of the transistor 104 will provide a forward bias to the base of the transistor switch 102 to override the signal from the photosensor 40, to thus continue driving the motor regardless as to whether the stereo light is on or not. Feedback resistor 106 feeds back the voltage from the emitter of the switch 102 to the base thereof, to latch the switch in its conducting mode, so that without any additional signals from the receiver, and without any additional signals from the receiver, and without any voltage from the photosensor, the motor 22 will continue to operate, until the photosensor is activated by the stereo indicating light.

In FIG. 3, the modular remote control R.F. receiver unit 20 is shown. The R.F. receiver unit has a housing 60 in which are mounted a plurality of interchangeable plug-in tuned circuit modules 62. The number of such plug-in modules depends upon the number of functions desired to be controlled. For example, if remote control of the bass function, the balance funtion, and the volume function are desired, then three such modules are needed. Each module has its own conventional LC tuned circuit, or the like, and its own dip switch to set the respective circuit at a distinct and prescribed resonant frequency, which will correspond with the signals being sent out by the corresponding modules in the transmitter unit. The R.F. receiver unit is also provided with a stereo receiver tuning module 64 which controls the motor 22, as described above, and to which the photosensor is connected.

If a stereo system that has a plurality of sets of speakers is used, then additional plug-in modules may be provided in the R.F. receiver, with each module controlling the volume of one set of speakers. All of the speaker-control modules would have identical phase lock loop circuitry. FIG. 1A shows such a system, and the R.F. receiver 20 in FIG. 3 shows the four separate interchangeable modules 62 for controlling the four sets of speakers and the tuner module 64. However, as mentioned above, if additional functions are desired to be controlled, then additional plug-in modules would be provided in the R.F. receiver unit by just merely plugging them in and setting each dip switch to a proper and distinct frequency. FIG. 4 shows the outlet connections at the rear of the R.F. receiver unit 20. Outlets 63 are for the motor drive assemblies, each being provided with a speed and torque adjustment 65 in the well-known manner. A.C. outlets 67 are also provided for the stereo receiver, A.C. power cord 36 and for other audio equipment as the circumstances warrant.

In FIG. 5, the transmitter 70 of the remote control system of the present invention is shown. Transmitter 70, which preferably transmits on UHF, has a housing 72 in which are mounted a plurality of interchangeable plug-in conventional tuned circuit modules 74 which correspond in number to the interchangeable modules in the R.F. receiver unit 20. In the example shown in FIGS. 3 and 5, where four sets of speakers are used in the stereo system and where control of the tuning of the stereo receiver is desired, four such interchangeable modules 74 are shown for the four sets of speakers, and one plug-in tuner module 76 is provided. The modules 74 are of the same phase lock loop circuitry and correspond to the four interchangeable modules of the R.F. receiver unit. Also, a power push button switch 75 to turn on or turn off the A.C. power outlets on the rear of the modular remote receiver unit 20 is provided, which switch operates to open and close a relay in the receiver unit 20 in the well-known manner.

The transmitter 70 has one conventional digital controlled oscillator (not shown) to excite all of the modules, so that each module distinct control signal is transmitted to the R.F. receiver 20. It will be noticed that each plug-in module 74 preferably has two directional push button control switches 74a and 74b so that the volume of each set of speakers may be lower or raised.

If, as mentioned above, further contol functions are desired to be employed, then additional plug-in modules would be mounted in the housing 72, which additional modules would correspond in number with those added to the R.F. receiver, with each additional module of the transmitter having its dip switch set to the same frequency as the dip switch on the corresponding module of the R.F. receiver unit. The transmitter 70 is powered by a separate power source, such as a battery cell.

It is pointed out, that in tuning the stereo receiver 10 to a desired radio station via the electric motor 30 controlled by the R.F. receiver unit and transmitter unit, the tuning dial will, upon reaching the end point of band travel, automatically reverse direction. The R.F. receiver unit will note a current drain when the tuning dial reaches the end point of its travel in either direction, due to stoppage of the motor, and the R.F. receiver unit will then reverse the polarity, which would then start the electric motor in the opposite direction.

While a specific embodiment of the invention has been shown and described, it is to be understood that numerous changes and modifications may be made therein without departing from the scope and spirit of the invention. For example, instead of a photovoltaic sensor, a photoconductive sensor may be employed to control the electric motor 30 via lead 41. Further, an annular adhesive ring 80 may be provided for the electric motors to insure proper and stable positioning of the motors on their respective control shafts. Such annular adhesive rings would project from the control shaft end of the electric motor and extend outwardly a distance necessary to grip firmly the stereo receivers front surface.

What is claimed is:

1. A remote control device for controlling an audio entertainment system, and the like, comprising:
   a transmitter unit for sending out signal waves;
   a receiver unit for accepting the signal waves from said transmitter unit;
   motor means operatively connected to said receiver unit, said motor means controlling the functions of the audio system to which it is attached;
   photosensing means for detecting specific settings of the tuner of the audio system mounted adjacent to the stereo indicator light of the audio system, and operatively connected to said motor means such that said motor means will stop the tuner upon reception of a signal from said photosensing means; and
   transistor switch means operatively connected between said photosensing means and said motor means for disconnecting said motor means upon reception of the signal constituting a negative bias from said photosensing means.

2. The remote control device according to claim 1, wherein said transistor switch means comprises a first transistor having its base reverse-biased by said photosensing means, and a second transistor in series with said first transistor, said second transistor being operatively connected to said base of said first transistor to forward bias said first transistor.

3. A remote control device for remotely controlling the operation of an audio unit, or the like, comprising:
   electric motor means mountable over at least one control shaft of the audio unit, said electric motor means comprising a casing and having a longitudinally extending drive shaft accessible at one end thereof;
   a turning knob mounted on said one end of said drive shaft, said knob allowing manual rotation of said drive shaft to thereby manually rotate and control a control shaft;
   a receiver unit for controlling the operation of said electric motor means;
   a transmitter unit for generating control signals to said receiver unit;
   photosensing means operatively connected to said electric motor means, said photosensing means being mountable about a stereo indicator light of an audio system; and
   transistor switch means having its base connected to the output of said photosensing means, and its output connected to said electric motor means, said photosensing means providing a reverse bias to shut off said transistor switch whenever the stereo light is lit, to stop the operation of said electric motor means.

* * * * *